United States Patent [19]

Kramer

[11] Patent Number: 4,651,480
[45] Date of Patent: Mar. 24, 1987

[54] HIGH STRENGTH MULTICOMPONENT EXTENDIBLE STRUCTURE

[75] Inventor: Richard E. Kramer, Damascus, Md.

[73] Assignee: Fairchild Industries, Inc., Chantilly, Va.

[21] Appl. No.: 810,353

[22] Filed: Dec. 18, 1985

[51] Int. Cl.⁴ .......................................... E04H 12/34
[52] U.S. Cl. ...................................... 52/108; 52/632; 182/41
[58] Field of Search ............... 52/108, 111, 117, 118, 52/632, 227; 182/40, 41

[56] References Cited

U.S. PATENT DOCUMENTS

| | | | |
|---|---|---|---|
| 1,531,982 | 3/1925 | Sago | 52/108 X |
| 3,314,200 | 4/1967 | Schuster | 52/108 |
| 3,805,462 | 4/1974 | Caperton | 52/108 |
| 4,386,485 | 6/1983 | Kramer | 52/108 |

FOREIGN PATENT DOCUMENTS

404298  6/1966  Switzerland ..................... 52/108

Primary Examiner—Carl D. Friedman
Assistant Examiner—R. Chilcot
Attorney, Agent, or Firm—Michael W. York

[57] ABSTRACT

A multicomponent extendible structure that includes a plurality of elongated flexible members having interlocking members on their edges for enabling the elongated members to have their edges become interlocked as the multicomponent extendible structure is extended or deployed. The interlocking members provide compressive strength to the multicomponent extendible structure when it is deployed. A series of thin cable members are associated with each of the elongated flexible members to provide tension strength to the multicomponent deployed extendible structure. The multicomponent extended structure also has provisions for resisting twisting and it can be used to deploy or extend a variety of types of loads and yet be retracted into a compact package when it is not in use.

11 Claims, 13 Drawing Figures

HIGH STRENGTH MULTICOMPONENT EXTENDIBLE STRUCTURE

BACKGROUND OF THE INVENTION

Multicomponent extendible structures are by no means new, and they have found many useful applications. Such structures have been utilized both on the ground and in space to provide rigid or semirigid extended structures which can be utilized as antennas or as booms for extending or retracting various types of equipment or to elevate and retract various types of equipment.

One of the primary advantages of a multicomponent extendible structure is that it comprises two or more elongated thin sheets of material which are capable of being rolled or otherwise compacted into a small compact package. As a consequence a multicomponent extendible structure need take up very little space when it is in its stored or packaged configuration and yet it is capable of being extended to form an elongaged structure of considerable length. This ability to transform itself from a small compact stored configuration into a comparatively large operational configuration makes such multicomponent extendible structures particularly attractive for use where it is necessary to have a compact configuration due to a limited capacity or volume for the extendible structure. This is particularly for such applications such as military antennas and the like where it is desirable to stow an antenna or the like in a small package when it is not in use since there may be only limited storage space available such as on a military vehicle.

One of the problems associated with such multicomponent extendible structures has been how to obtain a rigid structure when the multicomponent extendible structure is in its extended configuration. In this connection it is desirable that the extended multicomponent extendible structure have some type of cross section that lends rigidity to the extended structure. Such a cross section might take the form of a triangle, rectangle or the like. In order to obtain such a cross section it is necessary to interconnect the edge portions of the elongated sheets of material which form the multicomponent extendible structure. It is also important that the edges of these elongated sheets be securely fastened so that they cannot be pulled apart. Otherwise the multicomponent extendible structure would lose its rigidity and strength.

Various techniques have been tried in the past for fastening the edges of two or more elongated sheets of material together. One type of method of attachment is set forth in U.S. Pat. No. 3,503,164 which discloses a tubular extendible structure that is formed from two elongated sheets of material that have tabs and slots on the edges for joining the elongated sheets of material together. It should be noted however that the tubular extendible structure set forth in this patent is designed to have the tabs remain in the slots during the time that the tubular extendible structure is rolled into its stored compact configuration as well as when it is in its extended position. This may be somewhat satisfactory when there are only two elongated sheets of material involved and it is only desired to have a simple ring shaped or circular shaped cross section. However, for more complex structures which involve more than two elongated sheets, it is generally necessary to separate the sheets for storage purposes such as illustrated in U.S. Pat. No. 3,319,987 where the elongated sheets or strips are separated or rolled on a plurality of rollers. As illustrated in this patent the plurality of elongated sheets of material are fastened together by tongues and slots located along the respective edges of material. It should be noted however that these tongues and slots do not provide in themselves an edge locking system that prevents the edges of the adjacently located elongated sheets from being pulled apart when the multicomponent extendible structure is in its extended configuration.

These problems associated with the structures set forth in U.S. Pat. Nos. 3,503,164 and 3,319,987 have been largely overcome by the multicomponent extendible structure disclosed in U.S. Pat. 4,386,485. The invention set forth in this patent includes a multicomponent extendible structure that permits a plurality of elongated sheets of material to be separately and compactly stored but joined by securely joining the elongated sheets together at their edges when the multicomponent extendible structure is extended into its operational configuration.

While the invention set forth in U.S. Pat. No. 4,386,485 overcomes many of the problems associated with previous prior art structures, it is desirable to have an increased ability to withstand compressive loads and to have the ability to withstand tension loads. This is particularly true when the extendible structure is to be used to elevate heavy loads in a one g environment and where the extended structure will be exposed to large side loads such as would occur when the extended structure is exposed to strong winds or when it is extended at an angle. The latter could easily occur if the extendible structure was extended from a vehicle that was not on completely flat land.

The present invention overcomes the strength problems associated with the prior art extendible structures and provides an extendible multicomponent structure that has all of the advantages of the structure set forth in U.S. Pat. No. 4,386,485 but has exceptionally good resistance to compressive loads as well as tensional loads.

SUMMARY OF THE INVENTION

This invention relates to extendible structures and more particularly to multicomponent extendible structures.

Accordingly, it is an object of the present invention to provide a multicomponent extendible structure which is capable of being formed from two or more elongated sheets of material.

It is another object of the present invention to provide a multicomponent extendible structure which forms a rigid structure when it is in its extended configuration.

It is an object of the present invention to provide a multicomponent extendible structure that is very strong when in its extended configuration.

It is an object of the present invention to provide a multicomponent extendible structure that is capable of resisting high loads when it is in its extended configuration.

It is an object of the present invention to provide a multicomponent extendible structure that is capable of resisting high compressive loads.

It is an object of the present invention to provide a multicomponent extendible structure that is capable of resisting high tension loads.

It is an object of the present invention to provide a multicomponent extendible structure that is readily storable in a compact configuration.

It is an object of the present invention to provide a multicomponent extendible structure which has provisions for storing a plurality of elongated sheets separately in a compact configuration.

It is also an object of the present invention to provide a multicomponent extendible structure including a plurality of elongated sheets which are securely connected together when the extendible structure is in its extended configuration.

It is also an object of the present invention to provide a multicomponent extendible structure which is capable of being repeatedly moved from its stored compact configuration to its extended configuration and back to its stored configuration.

It is also an object of the present invention to provide a multicomponent extendible structure which has great strength when it is in its extended configuration.

It is also an object of the present invention to provide a multicomponent extendible structure in which the edges of elongated sheets of material are locked together when the extendible structure is in its extended configuration.

It is also an object of the present invention to provide a multicomponent extendible structure that includes a plurality of elongated sheets which are reinforced to give the extendible structure rigidity when it is in its extended configuration.

The foregoing and other objects are obtained by the present invention by providing a multicomponent extendible structure that includes a plurality of elongated sheets of material which each have two long edges and connecting means located along at least one of the long edge portions of the elongated sheets for connecting adjacently located long edge portions together when the adjacently located edge portions are in a substantially nonbent condition and for permitting the edge portions to be separated when the edge portions are in a bent condition. The connecting means also includes compressive load resisting means for resisting compressive loads when the plurality of elongated sheets of material are in their extended configuration.

BRIEF DESCRIPTION OF THE DRAWINGS

In order that the invention will be more clearly set forth and better understood, reference is made to the accompanying drawings in which.

DETAILED DESCRIPTION OF THE PREFERRED EMBODIMENTS

Figure 1:
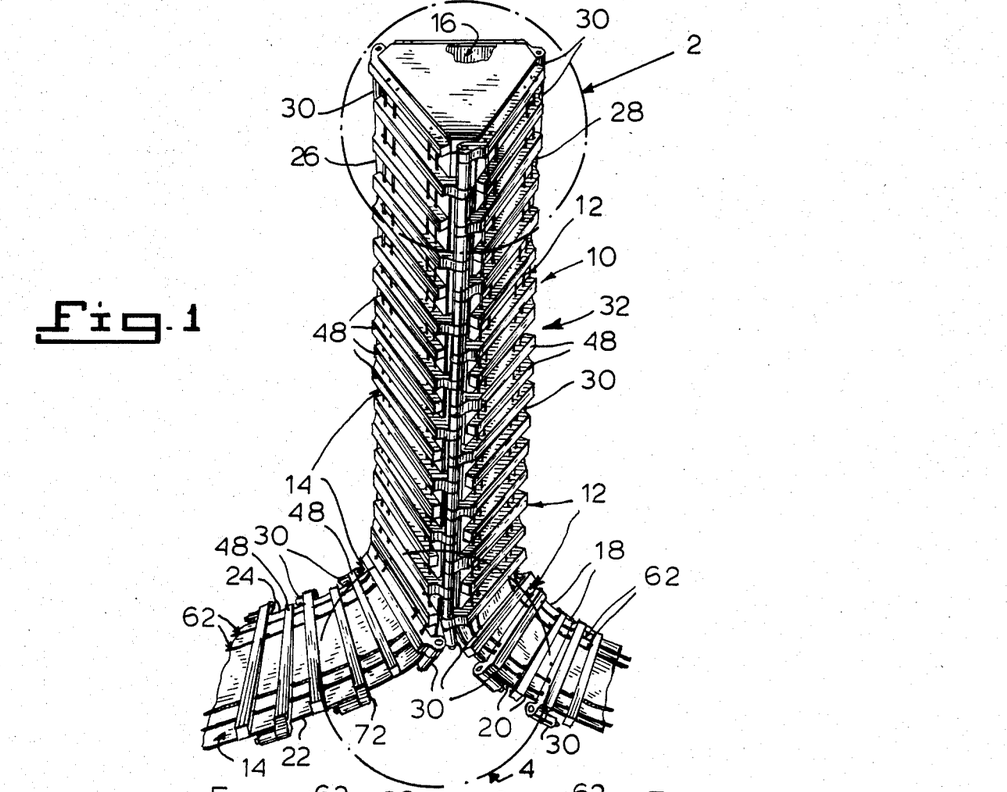
FIG. 1 is a perspective view of the high strength multicomponent extendible structure of the present in its partially extended or deployed position illustrating how the high strength multicomponent extendible structure is formed into its extended configuration.

Referring first to FIG. 1, the high strength multicomponent extendible structure of the invention is illustrated and is designated generally by the number 10. The high strength multicomponent extendible structure 10 comprises three substantially identical elongated flexible members designated generally by the numbers 12, 14 and 16. These elongated flexible members 12, 14 and 16 each have two long edge portions designated respectively by the numbers 18, 20, 22, 24, 26 and 28. Connecting means designated generally by the number 30 are located along each of the edge portions 18, 20, 22, 24, 26 and 28 for interconnecting the adjacently located edge portions, such as the portions designated 20 and 22, 24 and 26, and 28 and 18 when they are moved into their interconnecting positions to form the rigid triangular shaped structural portion illustrated generally by the number 32 in FIG. 1.

Figure 2:
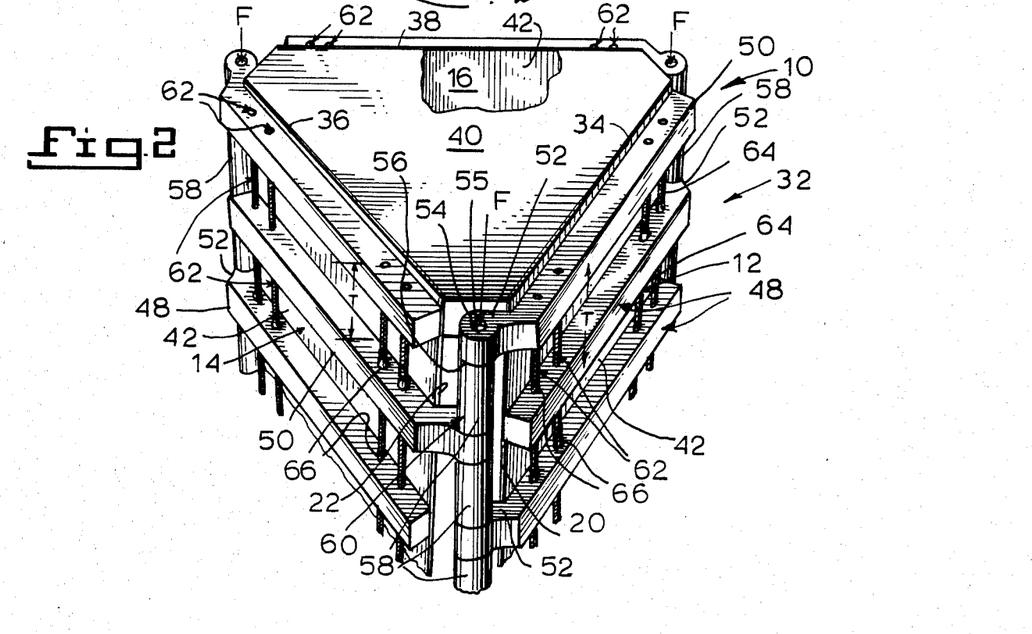
FIG. 2 is an enlarged portion of the structure illustrated in FIG. 1 taken within the circle 2 thereof.
Figure 3:
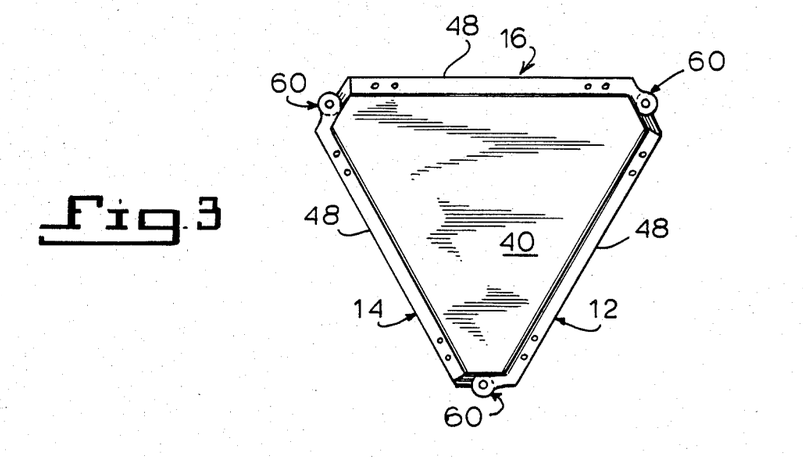
FIG. 3 is an enlarged top plan view of a portion of the structure illustrated in FIG. 1.

FIG. 2 is an enlarged view of the upper or top portion of the high strength multicomponent extendible structure 10 illustrated in FIG. 1 that illustrates in greater detail certain features of the high strength multicomponent extendible structure 10. As illustrated in FIGS. 2 and 3, the upper end portions of the elongated flexible members 12, 14 and 16 are connected by conventional means to the respective sides 34, 36 and 38 of a flat substantially triangular shaped closure member 40 that serves to close off and strengthen the upper end portion of the high strength multicomponent extendible structure 10. As best illustrated in FIG. 2 each of the elongated flexible members 12, 14 and 16 are substantially identical and constructed in substantially the same manner. In this connection each of the elongated flexible members 12, 14 and 16 comprises a thin flexible elongated sheet 42 that has edge the previously mentioned portions 18 and 20, 22 and 24, or 26 and 28.

Means for reinforcing the thin flexible elongated sheet 42 are associated with the elongated sheet 42 and comprise a series of elongated stiffening members desginated by the number 48 that are connected at spaced intervals along the outside of the elongated sheet 42 in a conventional manner with the elongated axis of the member 48 being substantially perpendicular or at a right angle with the elongated axis of the elongated sheet 42. These members 48 provide strength by stiffening the elongated sheet 42 and hence prevent or reduce twisting or buckling of this sheet 42 but they also provide other important strengthening features as will be hereinafter described in detail.

As best illustrated in FIG. 2, each elongated stiffening member 48 has a generally rectangular shaped, cross section elongated portion 50 that has one end portion connected to an inward or angular projecting portion 52 that projects inward around a portion of an edge of the corresponding elongated sheet 42. This projecting portion 52 has an aperture 54 that receives a projection 55 that extends from the end portion 56 of a generally cylindrical engaging and reinforcing member 58 that will be hereinafter described in greater detail. It will be noted that although the stiffening members 48 are substantially identical they are located along the elongated sheets 42 in such a manner that they are alternately reversed so that no two adjacently located stiffening members on the same elongated sheet 42 have adjacently located projecting portions 52. This is neceesary in order to permit the adjacent edge portions, such as the portions 20 and 22 of the elongated flexible members 12 and 14 to be interconnected.

As illustrated in FIGS. 1, 2 and 3, each projection 52 of the stiffening members 48 has a projecting cylindrical reinforcing member 58 connected to it by the cylindrical projecting portion 55 that fits tightly within the aperture 54. These reinforcing members 58 and the associated portions of each projection 52 form a generally cylindrical column designated generally by the number 60 when the multicomponent extendible structure 10 or a portion thereof is deployed or extended. This column 60 resists compressive forces such as those indicated by the letters in FIG. 2.

The high strength multiple component extendible structure 10 illustrated in FIGS. 1 and 2 also has means associated with each of the elongated flexible members 12, 14 and 16 for resisting tension forces which are designated generally by the number 62. The means for resisting tension forces 62 comprises one or more elongated flexible members 64 that may comprise a steel cable. These flexible members 64 are substantially identical and the members 64 are connected to one or more of the stiffening members 48. These members 64 resist tension forces such as those represented by the letters T in FIG. 2. These flexible members 64 pass through holes 66 in the elongated portion 50 of the stiffening members 48. Since these members 64 are fastened to the stiffening members 48 they combine with the stiffening members 48 to resist buckling of the sheet 42 that is attached to the stiffening members 48. In view of the foregoing, the combination of the stiffening members 48, reinforcing members 58 and the flexible members 64 resists compressive forces, tension forces as well as buckling forces.

Figure 4:
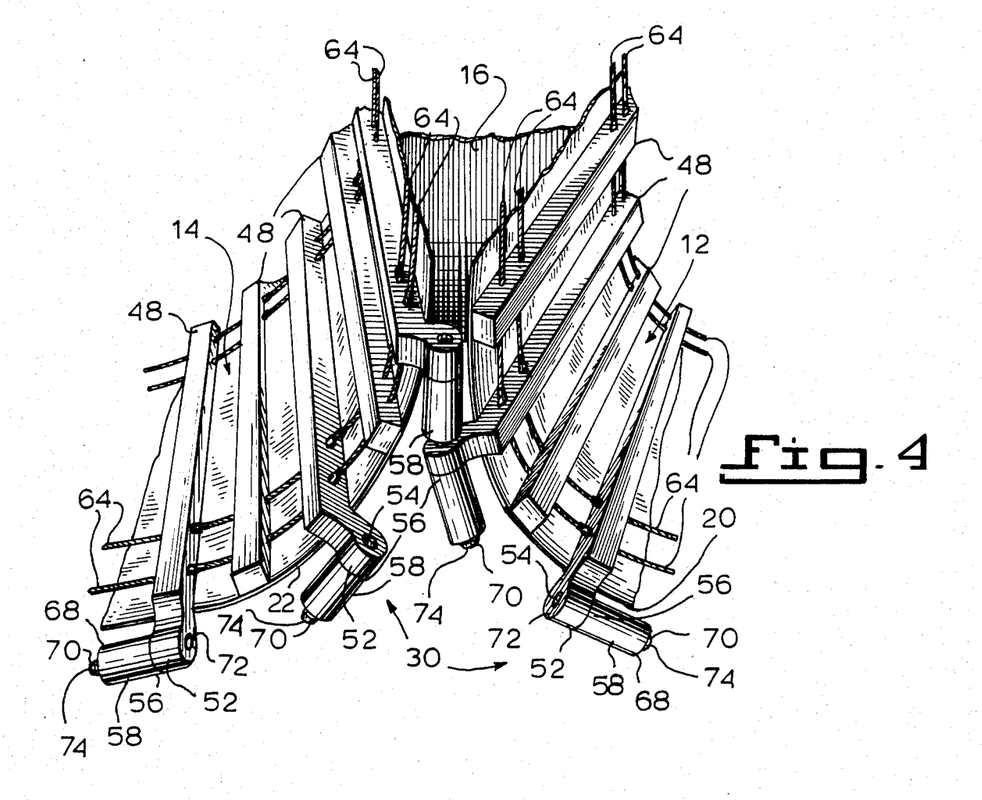
FIG. 4 is an enlarged portion of the structure illustrated in FIG. 1 taken within the circle 4 thereof.

FIG. 4 illustrates in greater detail the previously mentioned connecting means 30 that are associated with the adjacently located edge portions 20 and 22, 24 and 26, and 28 and 18 of the elongated flexible members 12, 14 and 16. The projecting connecting means 30 comprises the projecting portions 52 of the stiffening members 48 with their apertures 54 and the associated generally cylindrical engaging and reinforcing members 58 that have end portions 56 with projecting portions 55 (see FIG. 2) that rigidly fit in the apertures 54 of the projecting portions 52. The projecting connecting means is formed separate from and is thicker than the elongated flexible members 12, 14 and 16. The free ends 68 of the reinforcing members 58 or the ends opposite the end portions 56 each have a generally truncated cone sloped projection 70 that is adapted by its size and shape to be slidably received within the generally cylindrical aperture 54 of the adjacently located end portion 52 of the stiffening member 48 as the respective edge portions 20 and 15 of the elongated flexible members such as the flexible members 12 and 14 are being brought together.

Since there is insufficient distance between the upper surface 72 of the projecting portion 52 of the member 48 and the adjacently located tip 74 of the projection 70 of the same elongated flexible member such as the member 12 to receive the adjacently located engaging and reinforcing member 58 with its cone shaped projection 70 and the projecting portion 52 to which is connected, it is necessary to bend the flexible members 12, 14 and 16 as their edge portions 18, 20, 22, 24, 26 and 28 are about to be engaged as illustrated in FIGS. 1 and 4. This bending can be accomplished with means known in the art such as rollers (not shown) as described in U.S. Pat. No. 4,386,485.

Figure 5:
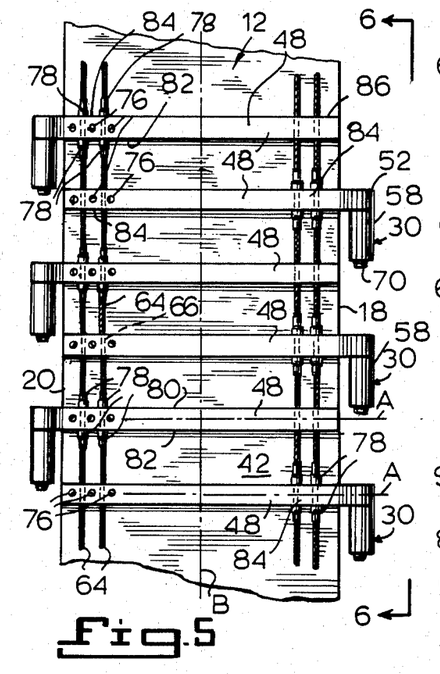
FIG. 5 is an enlarged disconnect portion of one side of the structure illustrated in FIG. 1.

FIG. 5 is an enlarged view of a portion of the elongated flexible member 12 shown in FIG. 1 which is removed from the rest of the structure shown in FIG. 1 that illustrates the components of the elongated flexible member 12 in greater detail. In addition, since all of the elongated flexible members 12, 14 and 16 are substantially identical, the details illustrated in FIG. 5 also apply to the elongated flexible members 14 and 16. As illustrated in FIG. 5 the elongated flexible member 12 comprises the elongated flexible sheet 42 with its edge portions 18 and 20 and a series of elongated substantially identical stiffening members 48 that are connected to the outside surface of the flexible sheet 42 at substantially equal intervals by means such as the screws 76 that pass partially through holes (not shown) in the flexible sheet 42 and are threaded into the stiffening members 48. As previously stated and as indicated the long axes of the stiffening members, represented by the letters A, are substantially perpendicular or at a substantially right angles with the long axis of the flexible sheet 42 that is represented by the letter B. This relationship between the axes A and B permits the flexible member 12 to have its maximum strength when the member 12 is in its extended position along with the associated flexible members 14 and 16 as illustrated in FIGS. 1 through 3.

As previoulsy indicated the elongated flexible members 64 pass through holes or grooves 66 in the stiffening members 48. In addition as indicated in FIG. 5, cable fittings or collars 78 are provided around the elongated flexible members 64 adjacent the upper surface 80 and the lower surface 82 of the end portion 84 of the stiffening members 48 that is located near the projection 52. These cable fittings or collars 78 are swaged in place about the flexible members 64 to transmit forces from the flexible members 64 to the adjacently located end portions 84 of the stiffening members 48 and from the end portions 84 of the stiffening members 48 to the adjacently located flexible members 64. The collars 78 form part of the means 62.

Figures 6, 10:
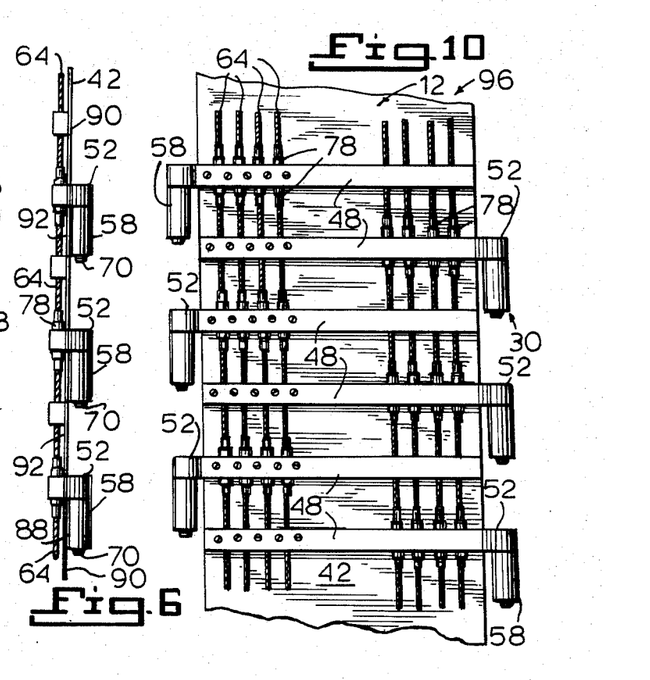
FIG. 6 is a side elevational view of the structure illustrated in FIG. 5 taken substantially in the direction by the line 6—6 thereof.
FIG. 10 is a view similar to the view illustrated in FIG. 5 illustrating an alternative embodiment of the invention.

FIG. 6 illustrates an edge view of the structure set forth in FIG. 5 taken substantially in the direction indicated by the line 6—6 in FIG. 5. It is important to note that the outer surface 88 of the engaging and reinforcing members 58 that is located nearest the sheet 42 be located inside of the inner surface 90 of the sheet 42. This is necessary for the proper engagement of the engaging and reinforcing members 58 as the high strength multicomponent extendible structure 10 is being deployed. It should be noted that although the elongated flexible members 64 are illustrated, such as set forth in FIGS. 5 and 6, as being located outside the outer surface 92 of the sheet 42, they could also be located inside the inside surface 90 of the sheet 42. This of course would require appropriate modifications to the stiffening members 48 and other associated members. However, in the preferred embodiment the elongated flexible members 64 are located outside the outer surface 92 of the sheet 42.

Figure 7:
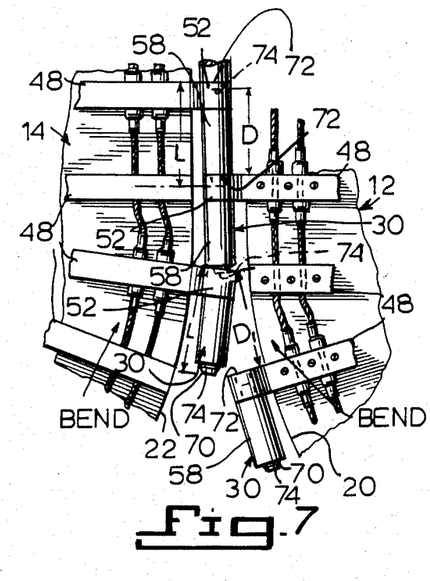
FIG. 7 is an enlarged view of a portion of the edge of the structure illustrated in FIG. 5 illustrating the edge portion as it is being interlocked with an adjacently interlocking edge portion.

FIG. 7 is an enlarged view of a portion of the edge of the structure set forth in FIG. 5 as it is being interlocked with an adjacently located interlocking edge portion. FIG. 7 illustrates portions of the elongated flexible members 14 and 12 with their respective long edge portions 22 and 20 with their connecting means 30 as the edge portions 22 and 20 are being interconnected. As illustrated in order to be interconnected the elongated flexible members 12, 14 and 16 are bent as illustrated in the bottom portion of FIG. 7 for the flexible members 14 and 12. As previously discussed, this bending of the elongated flexible members such as illustrated in FIG. 7 for the members 14 and 12 is necessary since the distance designated by the letter D between the upper surface 72 of the projecting portion 52 of the member 48 and the adjacently located tip 74 of the projection 70 of the same elongated member, such as that designated by the number 12 is too small to receive the adjacently located engaging and reinforcing member 58 associated with the elongated member 14, with its cone shaped projection 70 and the projecting portion 52 to which it is connected that have an overall length represented by the letter L.

However, as illustrated in the lower portion of FIG. 7 when the elongated member, this case member 12, is bent the previous distance represented by the letter D becomes in effect the distance represented by the designation $D_1$ that is now greater than the distance designated by the letter L. Consequently, the adjacently located projection 52 and the reinforcing member 58 fits in the distance represented by the designation $D_1$ and the aperture 54 of the projection 52 receives the projection 70 of the reinforcing member 58 located above the projection 52 which is associated with the adjacently located elongated member, in this case member 12 or 14. As the multicomponent extendible structure 10 is extended upward the respective projections 52 and the connected reinforcing members 58 associated with the member 12 become interconnected with the projections 52 and the reinforcing members 58 associated with the member 14 and hence the edges of the members 12, 14 and 16 are interconnected as illustrated in FIG. 8 for the members 12 and 14 to form the extended rigid structure 10 illustrated in FIG. 1.

Figure 8:
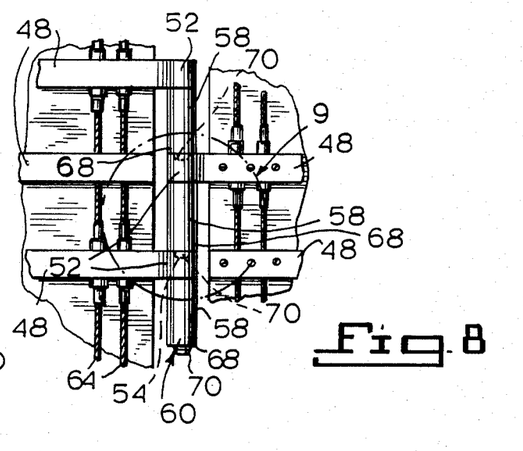
FIG. 8 is a view of the structure illustrated in FIG. 7 when the edge portions locked together as they would be when the associated portion of the high strength multicomponent extendible structure is in its extended or deployed configuration.

As illustrated in FIG. 8, all of the projecting portions 52 of the stiffening members 48 and their connected engaging and reinforcing members 58 associated with the elongated flexible member 12 are interconnected with the projecting portions 52 of the stiffening members 48 and their connected engaging and reinforcing members 58 associated with the adjacently located elongated flexible member 14. It will be noted, that in each instance the generally truncated conical shaped projections 70 located on the lower free end portions 68 of the engaging and reinforcing members 58 are located in the apertures 54, that are sized and shaped to receive the projections 70 which are located in the respective projecting portions 52 that are located immediately below the free and portions 68 of the engaging and reinforcing members 58. As previously indicated this results in a generally cylindrical column 60 that is very rigid and is highly resistant to compressive loads. Although only one column 60 is illustrated in FIG. 8, the same remarks apply to the column 60 that are associated with the other corners 60 of the extended rigid structure 10 such as those that are present at the juncture of the long edges of the elongated flexible members 14 and 16 and 16 and 12 as best illustrated in FIG. 3.

Figures 9, 11, 12, 13:
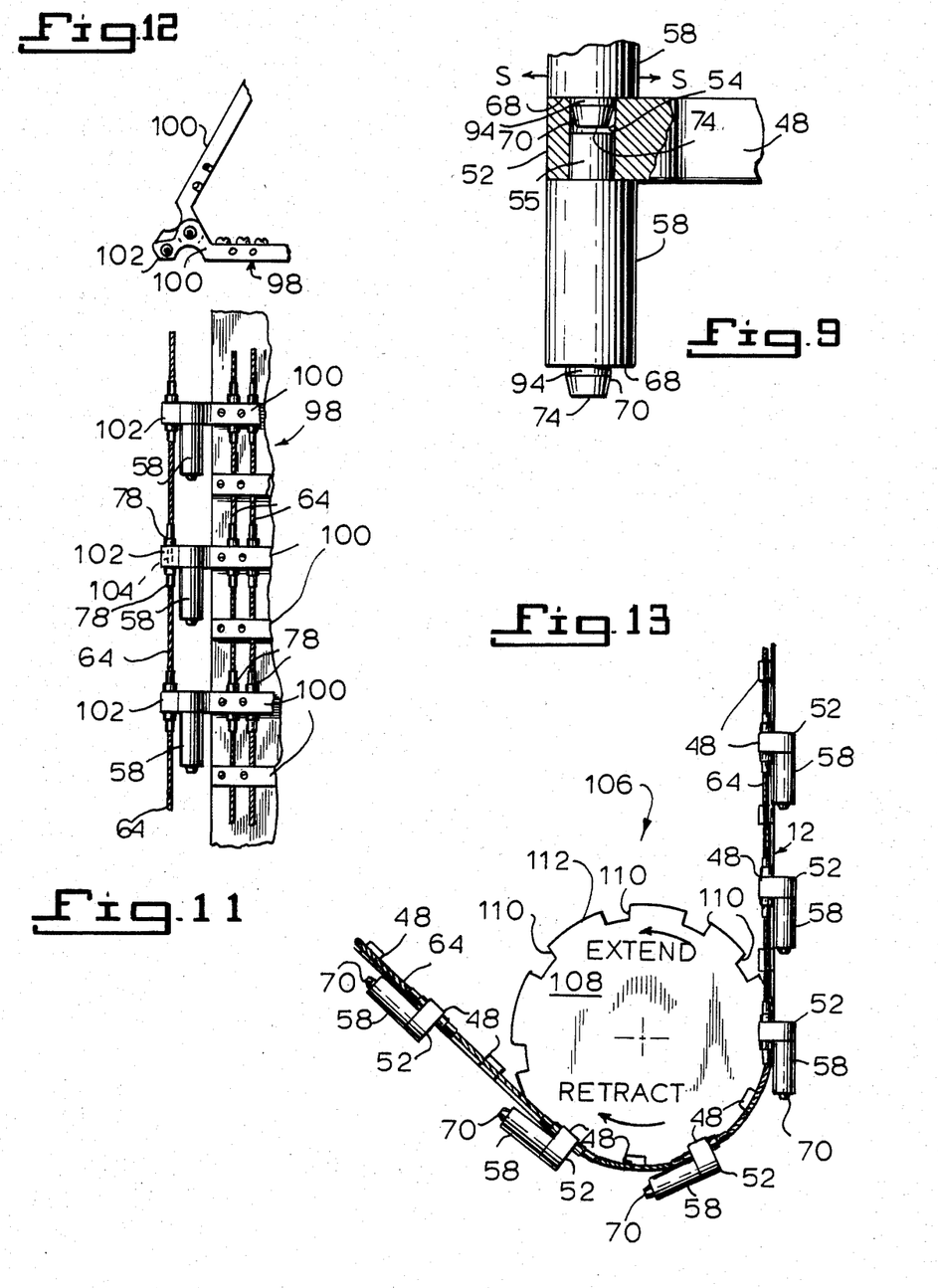
FIG. 9 is an enlarged partial sectional view or a portion of the structure illustrated in FIG. 8 taken within the circle 9 thereof.
FIG. 11 is a side elevational view similar to the view illustrated in FIG. 6 of an alternative embodiment of the invention.
FIG. 12 is a top plan view similar to a portion of the structure illustrated in FIG. 3 but illustrating the alternative embodiment of the invention shown in FIG. 11.
FIG. 13 is a side elevational view of a drive system associated with the embodiments of the invention illustrated in the other figures of the drawings showing how the high strength multicomponent extendible structure can be extended or formed into its extended or deployed configuration or retracted to is undeployed or stored configuration.

FIG. 9 illustrates in greater detail how the columns 60 are made rigid and how sidewise or lateral motion is reduced or eliminated. As illustrated in FIG. 9, the upper portion 94 of the generally truncated conical shaped projection 70 projecting from the lower or free end 68 of the engaging and reinforcing members 58 has a substantially cylindrical portion with a generally circular shaped cross section that is sized and shaped to form a tight slip fit within the generally circular cross sectioned aperture 54 located in the projecting portion 52 of the stiffening member 48. This tight slip fit between the upper portion 94 located adjacent the free end 68 and the aperture 54 in which it is located prevents a substantially eliminates sidewards or lateral motion represented by the letters S when the high strength multicomponent extendible structure 10 is in its extended position such as illustrated in the top portion of FIG. 1.

FIG. 10 illustrates another embodiment of the invention that is designated generally by the number 96. This embodiment 96 is identical to the previously described embodiment 10 except that additional elongated members 64 have been added than those set forth in FIG. 5 and also of course there would be the necessary cable fittings on collars 78 swaged in place about these additional elongated members 64 and the stiffening members 48 would have to be modified slightly to accept these additional elongated members 64. Even though only the elongated flexible member 12 is illustrated in FIG. 10, the other elongated flexible members 14 and 16 would also have the same number of additional flexible members 64. The advantage of this additional embodiment is that it is capable of resisting greater tension forces than the previously described embodiment 10. Of course, the number of additional flexible members 64 can be selected to meet the anticipated tension forces that the structure 96 may experience.

FIGS. 11 and 12 illustrate another embodiment of the invention that is designated generally by the number 98. This embodiment 98 is substantially similar to the previously described embodiment 10 with the exception that there are certain alterations to the structure set forth in the previous FIGS. 5 and 3 that are represented in FIGS. 11 and 12. As illustrated in FIGS. 11 and 12, the previously described stiffening members 48 have been replaced by new stiffening members designated by the numbers 100. These are stiffening members 100 are substantially similar to the stiffening members 48 except that they each have an outward curved projecting portion 102 that has an aperture 104 for receiving an elongated flexible member 64 that is crimped in place through the use of the cable fittings or collars 78 in the previously described manner. Although only one corner of the structure of the embodiment 98 is illustrated in FIGS. 11 and 12, it will be appreciated that substantially the same structural relationship would exist for the other two corners associated with the flexible members 14 and 16 and 16 and 12.

FIG. 13 illustrates drive means comprising a drive system designated by the number 106 for driving or deploying the high strength multicomponent extendible structure 10 and the embodiments designated by the numbers 96 and 98. The drive system 106 comprises a circular shaped wheel 108 that has substantially equally spaced generally rectangular shaped indentations 110 in its outer circumference 112. As illustrated in FIG. 13 these indentations 110 receive the center portions of the stiffening members 48 that are in turn attached to the flexible members such as the member 12 and consequently as the wheel rotates, such as indicated by the counter-clockwise arrow, this causes the member 12 and its associated structures to be extended or deployed to form the extended structure such as that illustrated in FIG. 1. In a similar manner the appropriate or clockwise rotation of the wheel 108 will cause the member 12 and its associated structures to be retracted. As a consequence through the use of three appropriately located drive systems 106 the entire structure 10 can be deployed or retracted and the same is true for the embodiments 96 and 98.

The invention including the embodiments designated by the numbers 10, 96 and 98 is manufactured and used in the following manner. The basic components such as the elongated flexible members 12, 14 and 16 which each comprise the flexible elongated sheet 42 are manufactured in a manner known to those skilled in the art and as set forth in U.S. Pat. No. 4,386,485. The stiffening members 48 and the reinforcing members 58 are manufactured by machining on the like from a suitable material such as a high strength aluminum alloy. The flexible members 64 can be made from high strength aircraft steel cables that are known in the art. It is important that the projecting portion 55 of the member 58 fit snugly within the appropriate aperture 54 of the appropriate stiffening member 48. It is also important that the flexible members 64 be tightly secured between the stiffening members 48 by the fittings or collars 78. Th wheel 108 that is connected to a suitable drive motor (not shown) known to those skilled in the art is manufactured from a suitably strong material that will also resist abrasion such as stainless steel and the like. Otherwise, the assembly of the embodiments 10, 96 and 98 is done through the use of techniques known to those skilled in the art.

In order to use the invention 10 including the embodiments 96 and 98 that function in essentially the same manner as the embodiment 10, the drive means comprising the drive system 106 is activated to cause the wheel member 108 to rotate through the use of conventional systems (not shown) that are known to those skilled in the art. This rotation is counterclockwise for deployment and clockwise for retraction as shown in FIG. 13. Although the drive system only illustrates the wheel member 108 that is associated with the flexible member 12 and its associated structures, it should be understood that the drive system 106 also includes substantially similar wheel members 108 that are associated with the other flexible members 14 and 16 so that all of the flexible members 12, 14 and 16 and their associated structures are extended or retracted at substantially the same time. Appropriate rollers such as those known in the art and set forth in U.S. Pat. No. 4,386,485 are used to guide the flexible members 12, 14 and 16 to cause their adjacently located edge portions to become interlocked in the previously described manner as the invention, such as the invention 10 is being deployed, or to become separated or not interlocked as the invention is being retracted or withdrawn to its nondeployed position or configuration.

The invention is particularly suited for use where there is a need to deploy or extend an object such as an antenna or the like at a height so that it is not masked by the surrounding terrain and yet be able to store the deployment system including the mast in a compact configuration when it is not in use.

Although the invention has been described in considerable detail with reference to a certain preferred embodiments it will be understood that variations or modifications may be made within the scope and spirit of the invention as defined in the appended claims.

What is claimed is:

1. A multicomponent extendible structure comprising a plurality of elongated sheets of material each having two long edge portions and means for interlocking the long edge portions of said elongated sheets located along at least one of each of the long edge portions of said elongated sheets for connecting adjacently located long edge portions together when the adjacently located edge portions are in a substantially non-bent condition and for permitting the edge portions to be separated when the edge portions are in a bent condition, said interlocking means comprising a series of projections located along the edge portion of one of said elongated sheets and a series of projections located along the adjacent edge portion of an adjacently located sheet, said respective projections being formed separate from and thicker than said elongated sheets and being connected to said elongaged sheets and being alternately located and sized and shaped to fit between each other as said adjacent edge portions are being formed into a non-bent condition from a bent condition, said adjacently located series of projections comprising means for resisting compressive forces when fitted between each other when said edge portions are formed into a non-bent condition, said series of projections forming at least a portion of a rigid column structure with the projections in abutting contact when said edge portions are formed into a non-bent condition.

2. The multicomponent extendible structure of claim 1 further comprising stiffening means associated with each of said elongated sheets for stiffening said elongated sheets.

3. The multicomponent extendible structure of claim 2 wherein said stiffening means comprises a series of elongated stiffening members connected to each of said elongated sheets.

4. The multicomponent extendible sturcture of claim 3 wherein said series of elongated stiffening members are connected at spaced intervals to a surface of said elongated sheets.

5. The multicomponent extendible structure of claim 4 wherein each of said elongated stiffening members each has a long axis and said elongated sheets each has a long axis and said elongated stiffening members are located in such a manner that the elongated axes of said elongated stiffening members are substantially perpendicular with the associated elongated axes of said elongated sheets.

6. The multicomponent extendible structure of claim 5 wherein each of said elongated stiffening members has an associated projection and said projection forms part of the series of projections located along the edge portion of an elongated sheet.

7. The multicomponent extendible structure of claim 1 further comprising tension force resisting means associated with each elongated sheet for resisting tension forces.

8. The multicomponent extendible structure of claim 7 wherein said tension force resisting means comprises a series of elongaged flexible members.

9. The multicomponent extendible structure of claim 8 wherein said elongate flexible members are operatively connected to said elongated sheets.

10. The multicomponent extendible structure of claim 9 further comprising a series of elongated stiffening members connected at spaced intervals to a surface of each of said elongated sheets and wherein said elongated flexible members are operatively connected to said elongated sheets by being connected to said stiffening members.

11. The multicomponent extendible structure of claim 1 further comprising means associated with said multicomponent extendible structure for extending said multicomponent extendible structure.

* * * * *